Feb. 16, 1965     F. V. LONG     3,170,152
PIPELINE LEAK DETECTION DEVICE
Filed June 8, 1961     2 Sheets-Sheet 1
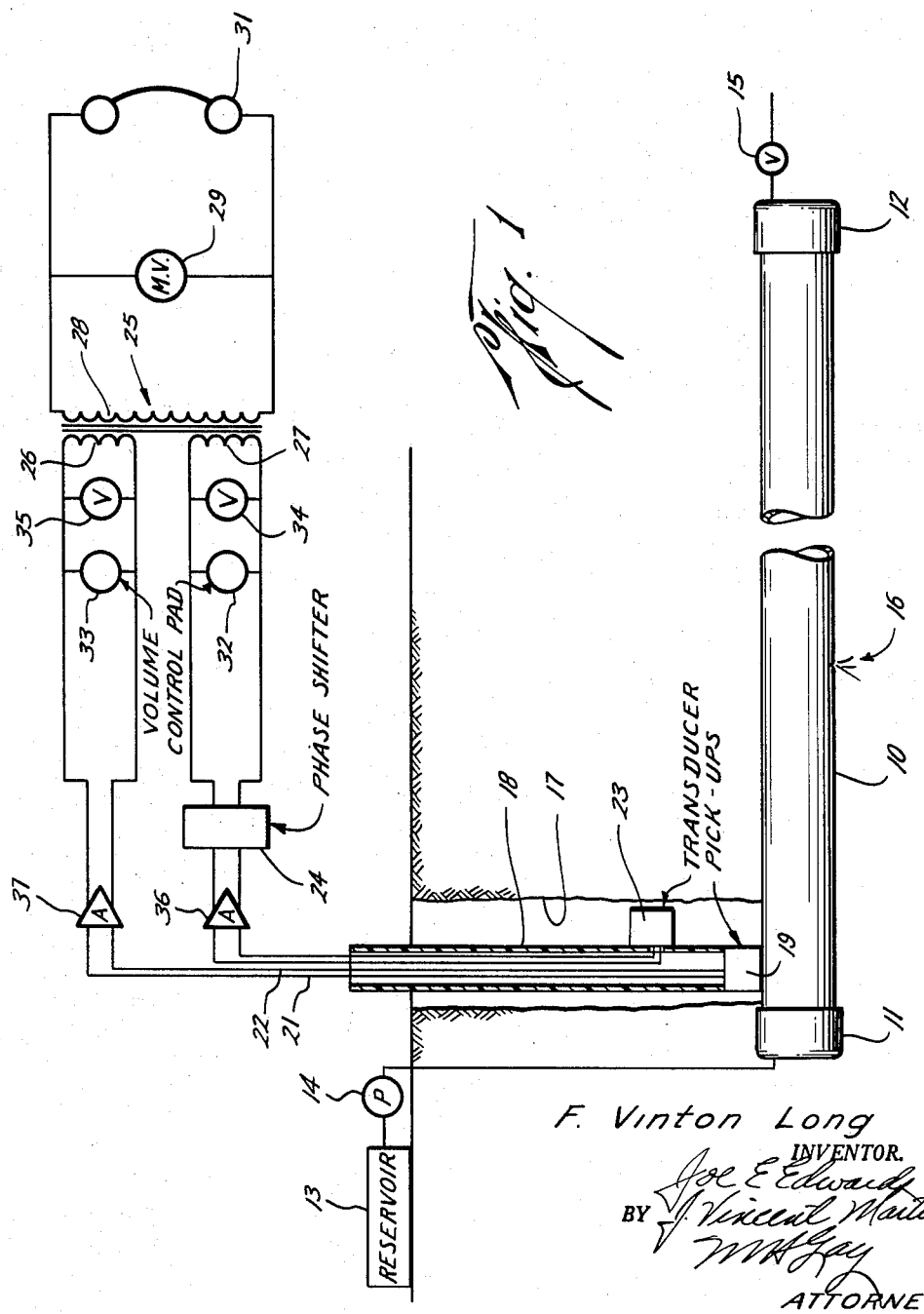
F. Vinton Long
INVENTOR.
BY Joe E. Edwards
J. Vincent Martin
M. H. Gay
ATTORNEYS

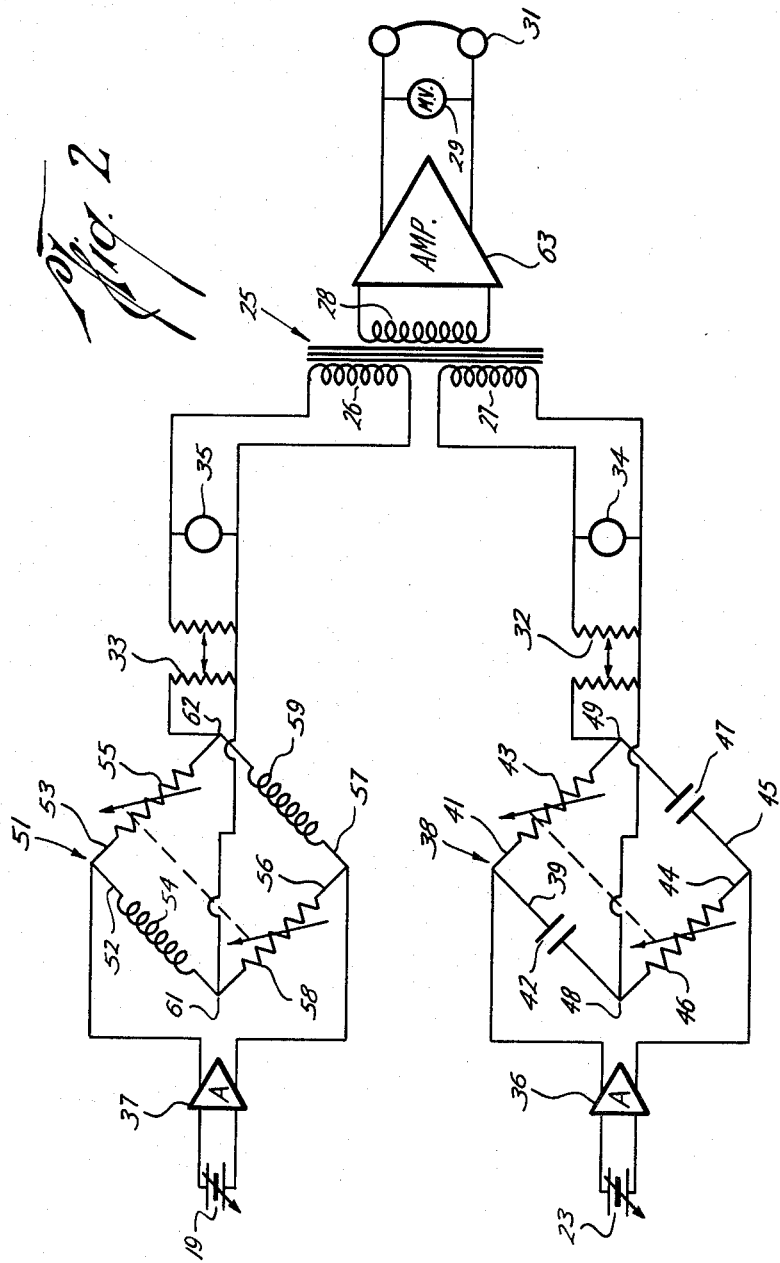

United States Patent Office 3,170,152
Patented Feb. 16, 1965

3,170,152
PIPELINE LEAK DETECTION DEVICE
Francis Vinton Long, Shreveport, La., assignor to Texas Eastern Transmission Corporation, Shreveport, La., a corporation of Delaware
Filed June 8, 1961, Ser. No. 115,814
4 Claims. (Cl. 340—242)

This invention relates to pipeline leak detection, and more particularly to a device which may be inserted in the ground until it contacts the pipe and senses the noise associated with a leak to assist in pinpointing the location of such leak.

The development of effective hydrostatic testing of new pipelines has proceeded beyond the development of techniques to locate the occasional leaks discovered.

Up to now two methods have been used to locate leaks; one, to walk the lines and look for surface seepage; and two, install manifolds and divide the line into shorter and shorter test sections until the leak is isolated in a reasonable length of pipe which may then be stripped for visual inspection.

Where surface seepage occurs, leaks may be easily pinpointed. Where the line must be divided into shorter and shorter sections the procedure is slow, tedious and extremely expensive due to the cost of installing manifolds, stripping of the line, and the loss of revenue time resulting from the many days consumed in the search.

An object of this invention is to provide a system for locating leaks in a pipeline where no surface seepage is present without the necessity of manifolding and dividing the line into short sections.

Another object is to provide a system for locating leaks in a pipeline by locating noise associated with a leak.

Another object is to provide a system as in the preceding object wherein the effect of ambient noise is eliminated to permit sensing of the noise associated with a leak.

Other objects, features and advantages of the invention will be apparent from the drawings, the specification and the claims.

In the drawings, wherein illustrative embodiments of this invention are shown;

FIGURE 1 is a schematic illustration of the device of this invention being used to locate a leak in a pipeline; and, FIGURE 2 is a circuit drawing showing one form of circuitry for eliminating the effect of ambient noises.

Referring first to FIGURE 1, a pipeline 10 provided with suitable end closures 11 and 12 is shown being tested by the introduction of a liquid such as water into the line under high pressure. The liquid may be drawn from a suitable reservoir 13 and introduced into the line under pressure by pump 14. During introduction of the liquid, air in the line may be removed through valve 15. If during testing of the line it appears that a leak is present, such as indicated at 16, the system of this invention is brought into play.

In using the system of this invention, a stob is driven through the backfill down to the pipeline to provide an opening 17. The stob is removed and the probe 18 inserted in the hole 17. While the hole might be made by the probe 18, it is preferred to have a ready-made hole to protect the probe 18.

A suitable pickup such as transducer 19 is provided on the end of probe 18 for contact with pipe 10. By providing the transducer on the end of the probe, the sonic vibrations caused by leak 16 may be directly sensed. The transducer 19 generates a signal responsive to any vibrations in pipe 10 caused by the noise associated with leak 16. The noise detected is the lower frequency signal generated by the jet stream coming out of the pipe due to turbulence in the stream and collision of the stream with particles of matter and the ground. This low frequency signal is audible and consists of a hissing sound. It might be noted that while it is preferred to test with water, gas such as air may be used as a testing fluid.

The signal from transducer 19 is transmitted through lines 21 and 22 to a suitable detection circuit in which the presence and degree of signal is determined.

The greatest difficulty with this type of leak detection is the noise picked up by the transducers from wind, crickets, trucks, or any other source of sound in the vicinity. In accordance with this invention, the system includes a means for cancelling out the effect of this ambient noise which is picked up by the transducer 19.

In order to sense ambient noise as distinguished from the noise generated by leak 16, a second transducer 23 is provided. This transducer may be at any desired location at which it has a good chance of picking up all or most of the ambient noise which will be effective on transducer 19. Preferably the noise transducer 23 is located closely adjacent to transducer 19, but is not in contact with pipe 10. As the backfill over the pipe will rapidly attenuate the noise vibrations in the pipe itself, the transducer may be positioned as close as about 2 inches from the pipe. Thus, it would be responsive to all of the noises to which the transducer 19 is responsive except those carried along pipe 10. Of course, the transducer 23 may be placed a greater distance from transducer 19, and in some instances where conditions are favorable it might conceivably be above ground level, but it is preferred that it be carried by probe 18.

Transducer 23 is shown to project outwardly from probe 18 for illustrative purposes. In practice it is preferably recessed in the wall of the probe 18 to avoid any damage thereto. Of course, the relative size of probe 18 and the transducer 23 is greatly in error in the drawings for the purpose of illustration. In practice transducer 23 would be very small relative to the size of probe 18.

Probe 18 may be fabricated from any desired material. Preferably a hollow plastic tube is used, as plastic will not tend to pick up and transmit noises.

Means are provided for changing the phase of the signals generated by transducers 19 and 23 until such signals are of opposite phase with each other. Thus, where the two transducers are picking up only ambient noise, the phase of the output of at least one of the transducers is shifted as by phase-shifter 24 until the outputs are of opposite phase.

Means are provided for receiving the two opposite phase signals and integrating the two signals. This integrating means might be any desired electronic or acoustical means which is capable of receiving two waves of opposite phase and integrating the two waves to give a resulting signal which represents the difference between the two signals. Thus, if the transducers 19 and 23 are excited by the same noises, their output will be of equal intensity and in the same phase. By reversing the phase of one or partially shifting the phase of both of these outputs until they are opposite and integrating the two signals, the result would be the absence of a signal.

As shown in FIGURE 1, a simple form of integrator may be provided by transformer 25 having a first primary winding 26 for receiving the signal from transducer 19 and a second primary winding 27 for receiving the signal from transducer 23. The transformer 25 integrates the two signals and any remaining signal is present in the secondary winding 28 of the transformer and may be sensed in any desired manner as by reading the millivolt meter 29 or listening to signals generated by earphones 31.

Due to the possibility of closer proximity of one of transducers 19 and 23 to a source of ambient noise than the other transducer, it is possible that the output of the transducers will not be at the same level. To provide for changing the output of the two signals when they are receptive to ambient noises only, suitable volume control pads 32 and 33 are provided in the output circuits of each transducer to permit adjustment of the output volumes of the signals.

Volt meters 34 and 35 are also provided to facilitate the making of fine adjustments when the probe is used closely adjacent the source of a leak.

Suitable amplifiers 36 and 37 are provided in the output circuit of each transducer to amplify the output signal to a desired degree.

In operation, the pipeline is first placed under a desired pressure with fluid, preferably water. If a leak is found to be present, a crew walks the pipeline and at spaced intervals drives a stob down to the pipeline. A sensing crew moves to the location of one of the stobs and removes it from the ground. The probe 18 is lowered into the ground and held at a position spaced from pipe 10. At this time both transducers 19 and 23 will pick up ambient noises. With the volume control pads 32 and 33 in full volume position, the phase shifter 24 changes the phase of the output of transducer 23 to shift it into opposite phase for the output of transducer 19. At this time any resulting signal which may appear due to different volume outputs of the two transducers will be indicated on volt meters 34 and 35 and a signal will be present in the secondary transformer 25 which will appear across millivolt meter 29 and in earphones 31. The volume control pads 32 and 33 are then separately adjusted as necessary to a point where the signals in each primary winding 26 and 27 of transformer 25 are equal. As these signals are out of phase, the two signals will be integrated in the transformer and the signal in the secondary will be eliminated. In this manner ambient noise will be cancelled out and will be ineffective in the system. At this time the probe is lowered until the transducer 19 contacts pipe 10. Any signal in pipe 19 which is in addition to the ambient signal being sensed by transducer 23 will be picked up by transducer 19 and the output of transducer 19 across primary 26 of transformer 25 will induce a signal in the secondary 28 of the transformer which will indicate the presence of a noise other than ambient noise. This signal may be received by earphones 31 and may be read from the millivolt meter 29.

Of course, along most of the pipeline being tested no signal will be received other than ambient noise. Once a signal other than ambient noise is received, it will be a signal due to the escape of fluid from leak 16. By taking readings at spaced points and then at intermediate points, the leak 16 may be pinpointed due to the increase in signal noise as the probe is moved closer to leak 16. It might be noted that as the probe is moved very close to signal 16, a very sensitive system would generate a rather high signal in the output of the transformer. This may be avoided by reducing the output volume when cancelling out ambient noise by reducing the volume control pads 32 and 33 by an equal amount.

Present knowledge indicates that the transducers should be sensitive to a range of 1500 to 2000 cycle per minute, and preferably would be insensitive in other ranges, as it is the present belief that the signal sensed in the pipeline is in this range. However, if the signal resulting from the leak is found to be outside of this range, the transducers should be sensitive to the frequency of the noise generated by the leak.

Referring now to FIGURE 2, there is shown a simple circuit for shifting the phase of the output signal of transducers 19 and 23. The output of transducer 23 is fed to the bridge circuit indicated generally at 38. The output from one side of transducer 23 is divided and passes through leg 39 of the bridge and 41 of the bridge. A capacitor 42 is provided in leg 39. A variable resistance 43 is provided in leg 41. In like manner, the output from the other side of the transducer 23 is introduced into legs 44 and 45 of the bridge. A variable resistance 46 is provided in leg 44 and a capacitor 47 is provided in leg 45. The two variable resistances 43 and 46 are ganged together. The output from the bridge circuit is taken in the usual manner from the junction 48 of legs 39 and 44 and the junction 49 of legs 41 and 45. This output is fed to the gang control pad 32.

The ganged resistances 43 and 46 short out the capacitances 42 and 47 a selected amount. This effects a lead in the output of the bridge circuit relative to the phase output of transducer 23.

The output from transducer 19 is fed to a bridge 51. One lead from the transducer is fed to legs 52 and 53 of bridge 51. An inductance 54 is provided in leg 52 and a variable resistance 55 is provided in leg 53. The other lead from transducer 19 is fed to legs 56 and 57 of bridge 51. A variable resistance 58 is provided in leg 56 and an inductance 59 is provided in leg 57. The two resistances 55 and 58 are ganged together and may be varied to change the effect of the inductances 54 and 59 to provide an output across points 61 and 62 of the bridge whose phase lags the output phase of transducer 19. The output from points 61 and 62 is fed to the volume control 33. It will readily be seen that as bridge 51 provides for a lag in phase and bridge 38 a lead in phase, the two sets of ganged resistances may be varied until the output phases of bridge circuits 51 and 38 are approximately opposite.

FIGURE 2 illustrates an amplifier 63 which may be provided in the output of the secondary 28 of transformer 25 to increase the output signal if desired.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A pipeline leak detection device comprising, a probe adapted to be inserted into the ground until one end of the probe contacts a pipe to be tested, a first transducer on said end of the probe for contacting the pipe to be tested, a second transducer substantially identical to the first transducer mounted on said probe and spaced from said first transducer and positioned to be out of contact with said pipe when the end of the probe is in contact with said pipe, means for shifting the phase of the output from at least one of said transducers until the output of said transducers is approximately 180° out of phase with each other, means for integrating the output of said transducers, and means for sensing any remaining signal after said integration.

2. A pipeline leak detection device comprising, a probe adapted to be inserted into the ground until one end of the probe contacts a pipe to be tested, a first transducer on said end of the probe for contacting the pipe to be tested, a second transducer substantially identical to the first and spaced from said first transducer and carried by the probe remote from said one end thereof, means for shifting the phase of the output from at least one of said transducers until the output of said transducers is approximately 180° out of phase with each other, means for adjusting the volume of the output of each transducer, means for integrating the output of said transducers, and means for sensing any remaining signal after said integration.

3. The device of claim 2 wherein the means for shifting the phase of at least one of said transducers is adjustable to permit an operator to adjust the output phase until signals generated by the transducers in response to identical noises are cancelled out.

4. A pipeline leak detection device comprising, a probe adapted to be inserted into the ground until one end of the probe contacts a pipe to be tested, a first transducer on said end of the probe for contacting the pipe to be tested, a second transducer spaced from said first transducer and carried by the probe remote from said one end thereof, means for shifting the phase of the output from at least one of said transducers until the output of said transducers is approximately 180° out of phase with each other, a transformer having two primary windings each receiving the output of a transducer after said phase shift, and sensing means connected to the secondary winding of said transformer for sensing any signal in said secondary winding.

References Cited by the Examiner
UNITED STATES PATENTS

| | | | |
|---|---|---|---|
| 1,312,809 | 8/19 | Scribner et al. | |
| 1,356,403 | 10/20 | Pridham | 179—1.8 |
| 2,210,028 | 8/40 | Doherty | 330—124 XR |
| 2,285,912 | 6/42 | De Monte | 340—253 |
| 2,400,552 | 5/46 | Hoover | 340—6 |
| 2,444,069 | 6/48 | Sivian | 340—6 |
| 2,465,110 | 3/49 | Mead | 323—123 XR |
| 2,525,425 | 10/50 | Reynst | 323—123 |
| 2,652,530 | 9/53 | Davidson | 324—88 XR |
| 2,972,018 | 2/61 | Hawley et al. | 179—1.8 |
| 2,992,394 | 7/61 | Cook | 324—83 XR |
| 2,997,668 | 8/61 | Nolle | 330—124 XR |
| 3,022,459 | 2/62 | Alper | 324—83 |
| 3,028,450 | 4/62 | Manning | 340—242 XR |

FOREIGN PATENTS 524,095    7/40    Great Britain.

NEIL C. READ, *Primary Examiner.*

BENNETT G. MILLER, *Examiner.*